United States Patent [19]

Ikeda et al.

[11] 4,068,063

[45] Jan. 10, 1978

[54] CATALYST COMPOSITION FOR RING-OPENING POLYMERIZATION OF NORBORNENE DERIVATIVES AND PROCESS FOR POLYMERIZING SAME

[75] Inventors: Hiroharu Ikeda; Shuichi Matsumoto; Kenya Makino, all of Yokohama, Japan

[73] Assignee: Japan Synthetic Rubber Co., Ltd., Tokyo, Japan

[21] Appl. No.: 512,790

[22] Filed: Oct. 7, 1974

[30] Foreign Application Priority Data

Oct. 9, 1973 Japan .................................. 48-113585
Oct. 9, 1973 Japan .................................. 48-113586
Oct. 9, 1973 Japan .................................. 48-113587

[51] Int. Cl.² .......................................... C08F 4/78
[52] U.S. Cl. .................................. 526/97; 252/429 C; 252/430; 252/431 R; 526/114; 526/115; 526/258; 526/271; 526/281
[58] Field of Search .................. 260/85.5 M, 85.5 HC, 260/88.7 C, 88.7 A, 88.5 A, 78.4 N, 78.5 N, 93.1; 526/114, 97, 115, 281

[56] References Cited

U.S. PATENT DOCUMENTS

| | | | |
|---|---|---|---|
| 3,458,489 | 7/1969 | Natta et al. ........................ | 260/93.1 |
| 3,707,520 | 12/1972 | Pampus et al. ..................... | 260/93.1 |
| 3,790,544 | 2/1974 | Maertens et al. ................... | 526/308 |
| 3,798,175 | 3/1974 | Streck et al. ...................... | 260/93.1 |
| 3,856,758 | 12/1974 | Ueshima et al. ................... | 260/78.41 |
| 3,859,265 | 1/1975 | Hepworth .......................... | 260/88.7 A |
| 3,883,495 | 5/1975 | Maertens et al. ................... | 526/114 |

*Primary Examiner*—Edward J. Smith
*Attorney, Agent, or Firm*—Ladas, Parry, Von Gehr, Goldsmith & Deschamps

[57] ABSTRACT

A catalyst composition consisting essentially of a reaction mixture of (A) at least one member selected from the group consisting of compounds of W, Mo, Re and Ta, (B) at least one member selected from the group consisting of organometallic compounds of elements of Groups IA, IIA, IIB and IIIA of the Deming Periodic Table, and (C) at least one member selected from the group consisting of compounds of V, Cr, Mn, and elements of Groups IVB and VIII of the Deming Periodic Table, has a very high activity in the ring-opening polymerization of norbornene derivatives having at least one polar substituent selected from the group consisting of ester groups, nitrile groups, amide groups, imide groups, carboxylic acid anhydride groups and halogens. The metal atom ratio of (C)/(A) is usually 0.001 - 50, and the molar ratio of (B)/(A) is usually 1 - 10. At least one said norbornene derivative and at least one cyclo-olefin other than cyclohexene can also successfully be subjected to ring-opening copolymerization with said catalyst.

22 Claims, No Drawings

CATALYST COMPOSITION FOR RING-OPENING POLYMERIZATION OF NORBORNENE DERIVATIVES AND PROCESS FOR POLYMERIZING SAME

This invention relates to a process for polymerizing norbornene derivatives. More particularly, the invention pertains to a novel catalyst composition extremely high in activity for the production of polymers of norbornene derivatives having at least one polar substituent selected from ester groups, nitrile groups, amide groups, imide groups, carboxylic acid anhydride groups, and halogens, particularly norbornene derivatives having said substituents at the 2- and/or 3-positions, and to a process for polymerizing said norbornene derivatives with said catalyst composition.

Processes for the ring-opening polymerization of cycloolefinic hydrocarbons having no polar groups have heretofore been studies in considerable detail, and particular attention is being directed to a polymer of cyclopentene as a polypentenamer in industry.

On the other hand, the polymerization of cycloolefins having polar substituents such as ester or nitrile groups is being watched with interest as processes for the production of new high polymers, and only a few processes have already been reported successful because of such difficulties as inactivation of catalyst due to the polar substituents, etc. Typical is a process in which the cycloolefins having polar substituents are subjected to polymerization in an alcohol or in emulsion in water in the presence of a compound of such a noble metal as Ru, Ir or Os (refer to French Pat. Nos. 1,556,215 and 1,594,934). However, the noble metal catalyst used in said processes is expensive and has no sufficiently practical activity. As a process using a less expensive catalyst, there has been proposed only a process in which a so-called Ziegler type catalyst composed of a compound of W, Mo or Ta and an organometallic compound of a metal of Group IA, IIA, IIB or IIIA of the Periodic Table is used (DOS 2,231,995). The said patent publication describes that to the catalyst system may be added a peroxide, hydroperoxide or an alcohol as an organic oxygen compound, but is entirely silent on the effect of addition of the organic oxygen compound.

However, all these catalysts are not so sufficient in activity as to be successfully usable for commercial scale polymerization, and give only unsatisfactory results particularly when the polymerization is carried out in a hydrocarbon solvent. Accordingly, the development of a catalyst having a higher activity has been desired earnestly.

The present inventors have made extensive studies with an aim to develop a catalyst having so high an activity as to enable the commercial scale ring-opening polymerization of norbornene derivatives. As a result, the inventors have found that a catalyst composition consisting essentially of a reaction mixture of a compound of W, Mo, Re or Ta, an organometallic compound of an element of Group IA, IIA, IIB or IIIA of the Deming Periodic Table and a compound of V, Cr or Mn, or a compound of an element of Group IVB or VIII of the Deming Periodic Table (see Lange's Handbook of Chemistry, Revised Tenth Edition, pages 60 – 61) has a much higher activity than the conventional catalyst, and displays a satisfactory activity even in a hydrocarbon solvent such as toluene.

An object of this invention is to provide a novel catalyst composition for the ring-opening polymerization of norbornene derivatives having polar substituents.

Another object of this invention is to provide a catalyst composition which is less expensive and is far higher in activity than conventional catalysts and which can display a satisfactory activity even in a hydrocarbon solvent.

A further object of this invention is to provide a process for polymerizing norbornene derivatives having at least one polar substituent by use of said catalyst composition.

Other objects and advantages of this invention will become apparent from the following description.

In accordance with this invention, there is provided a novel catalyst composition consisting essentially of a reaction mixture of (A) at least one member selected from the group consisting of compounds of W, Mo, Re and Ta, (B) at least one member selected from the group consisting of organometallic compounds of elements of Groups IA, IIA, IIB and IIIA of the Deming Periodic Table, and (C) at least one member selected from the group consisting of compounds of V, Cr, Mn, and elements of Groups IVB and VIII of the Deming Periodic Table. This invention further provides a process for producing a polymer or copolymer of norbornene derivatives, which comprises contacting at least one norbornene derivative having at least one polar substituent selected from the group consisting of ester groups, nitrile groups, amide groups, imide groups, carboxylic acid anhydride groups and halogens or a mixture of at least one said norbornene derivative and at least one cycloolefin other than cyclohexene, with the above catalyst composition.

Compounds of W, Mo, Re and Ta suitable as the component (A) of the catalyst composition of this invention are halides, oxyhalides, alkoxyhalides, alkenoxyhalides, phenoxyhalides, alkoxides, alkenoxides, phenoxides, carboxylates, acetylacetonates, oxyacetylacetonates, carbonyl complexes, acetonitrile complexes, hydride complexes, and derivatives and combinations thereof. Alternatively, there may be used mixtures of two or more compounds which can form the said compounds by reaction. These compounds may have been complexed with a proper complexing agent such as $PPh_3$ or $C_5H_5N$. Concrete examples of the compounds include $WCl_6$, $WCl_5$, $WCl_4$, $WBr_6$, $WF_6$, $WI_6$, $MoCl_5$, $MoCl_4$, $MoCl_3$, $ReCl_5$, $WOCl_4$, $MoOCl_3$, $ReOCl_3$, $ReOBr_3$, $W(OPh)_6$, $WCl_2(OPh)_4$, $Mo(OC_2H_5)_2Cl_3$, $Mo(OC_2H_5)_5$, $MoO_2(acac)_2$, $W(OCOR)_3$, $W(CO)_6$, $Mo(CO)_6$, $Re_2(CO)_{10}$, $ReOBr_3 \cdot PPh_3$, $WCl_5 \cdot PPh_3$, $WCl_6 \cdot C_5H_5N$, $W(CO)_5 \cdot PPh_3$, $W(CO)_3(CH_3CN)_3$, $TaCl_5$ and $TaBr_5$, wherein Ph means phenyl, acac means acetylacetone residue and R means a hydrocarbon group.

As the component (A), compounds of W and Mo, particularly halides, oxyhalides, alkoxyhalides and phenoxyhalides of W and Mo are preferable in view of their polymerization activity and practicality.

Compounds suitable as the component (B) of the catalyst composition of this invention are compounds of elements of Groups IA, IIA, IIB and IIIA of the Deming Periodic Table which have at least one element-carbon bond. Concrete examples of the compound include n-$C_4H_9Li$, n-$C_5H_{11}Na$, $C_5H_5Na$, $CH_3MgI$, $C_2H_5MgBr$, $CH_3MgBr$, n-$C_3H_7MgCl$, t-$C_4H_9MgCl$, $CH_2=CH-CH_2-MgCl$, $(C_2H_5)_2Zn$, $(C_2H_5)_2Cd$, $CaZn(C_2H_5)_4$, $(CH_3)_3B$, $(C_2H_5)_3B$, (n-$C_4H_9)_3B$, $(CH_3)_3Al$, $(C_2H_5)_3Al$, $(C_2H_5)_3Al \cdot O(C_2H_5)_2$, ($C_2H_5)_2AlCl$, $C_2H_5AlCl_2$, $(C_2H_5)_2AlH$, (iso-$C_4H_9)_2AlH$, $(C_2H_5)_2AlOC_2H_5$, (iso-$C_4H_9)_3Al$, $(C_2H_5)_3Al_2Cl_3$, (n-$C_6H_{13})_3Al$, (n-$C_8H_{17})_3Al$, and mixtures of two or more of said compounds. Alternatively, there may be used mixtures of two or more compounds which can form the said compounds by reaction.

As the component (B), organometallic compounds of Al, Mg and Zn, particularly those of Al, are more preferable.

Compounds of V, Cr and Mn suitable as the component (C) of the catalyst composition of this invention include oxides; hydroxides; halides; inorganic acid salts such as sulfates, nitrates, phosphates and the like; organic acid salts such as formates, acetates, and the like; pseudo-halides; acetylacetone complexes, alkoxides; alkenoxides; phenoxides; and amine complexes, and these compounds may have water of crystallization.

Concrete examples of the compounds include $V_2O_5$, $CrO_3$, $MnO_2$, $Cr(OH)_3$, $Mn(OH)_2$, $VCl_3$, $VCl_4$, $VOCl_3$, $V(OC_2H_5)_2Cl_3$, $CrCl_2$, $CrCl_3.3H_2O$, $MnCl_2$, $VSO_4$, $Cr(NO_3)_3$, $Cr_2(SO_4)_3$, $MnSO_4$, vanadium octenoate, vanadium naphthenate, chromium naphthenate, manganese naphthenate, $Mn(OCOCH_3)_2$, $Cr(OCOCH_3)_3$, $V(acac)_2$, $Cr(acac)_3$, $VO(acac)_2$, $Mn(acac)_3$ in which acac means acetylacetone residue, $CrO_2Cl_2$, $V(OC_2H_5)_3$ and the like.

Compounds of elements of Group IVB of the Deming Periodic Table suitable as the component (C) are oxides, halides, inorganic acid salts such as sulfates, phosphates, and the like; alkoxyhalides, alkenoxyhalides; phenoxyhalides; alkoxides; alkenoxides; phenoxides; acetylacetone complexes; cyclopentadienyl complexes; hydride complexes; silicides; and the like.

Concrete examples of the compounds include $TiO_2$, $ZrO_2$, $HfO_2$, $TiBr_4$, $ZrCl_4$, $HfCl_4$, $(CH_3O)_2TiCl_2$, (n-$C_4H_9O)_2TiCl_2$, $C_2H_5OZrCl_3$, $Ti(OC_2H_5)_4$, Ti(Oiso-$C_3H_7)_4$, Ti(Ot-$C_4H_9)_4$, Zr(On-$C_4H_9)_4$, Hf(On-$C_4H_9)_4$, $Ti(OC_3H_5)_4$, $Ti(OC_6H_5)_4$, $Ti(SO_4)_2$, $Ti_3(PO_4)_4$, $Zr_3(PO_4)_4$, $TiO(acac)_2$, $Zr(acac)_4$, $Hf(acac)_4$ in which acac means acetylacetone residue, $(C_5H_5)_2TiCl_2$, TiSi and the like. These compounds may have water of crystallization.

Compounds of elements of Group VIII of the Deming Periodic Table suitable as the component (C) of the catalyst composition include oxides; peroxides; hydroxides; halides; inorganic acid salts, such as sulfates, phosphates and the like; organic acid salts such as formate, acetate and the like; acetylacetone complexes; alkoxides; alkenoxides; phenoxides; ammine complexes and the like. These compounds may be complexed with a suitable complexing agent such as pyridine, $P(C_6H_5)_3$ or the like, and also may have water of crystallization.

Concrete examples of the compounds include $Fe_2O_3$, $Ni_2O_3$, $Co_2O_3$, $RuO_2$, $PtO_2$, $OsO_4$, $NiO_2$, NiO, $Fe(OH)_3$, $FeCl_2$, $FeCl_3.6H_2O$, $NiCl_2$, $CoCl_2$, $RhCl_3.3H_2O$, $RuCl_3.3H_2O$, $RuBr_3$, $PdCl_2$, $IrCl_3$, $OsCl_3$, $PtCl_2$, $H_2PtCl_6$, $FeSO_4$, $CoSO_4.6H_2O$, $NiSO_4$, nickel phosphate, $Ni(OCOCH_3)_2$, $Co(OCOC_2H_5)_2$, nickel naphthenate, cobalt octenoate, iron naphthenate, $Fe(acac)_3$, $Fe(acac)_2$, $Co(acac)_3$, $Ni(acac)_2$, $Pd(acac)_2$ in which acac means acetylacetone residue, $Fe(On-C_4H_9)_3$, $IrCl[P(C_6H_5)_3]_3$, $Rh(CO)Cl[P(C_6H_5)_3]_2$, $CoBr_2[P(C_6H_5)_3]_2$, $PdCl_2[C_6H_5CN]_2$, and the like. However, these compounds are not limitative.

In the present invention, the method of the preparation of the catalyst is not particularly limited, but the component (B) is preferably added to a reaction mixture of the component (A) with the component (C). Further, the preparation of the catalyst may be carried out either in the presence or absence of the monomer.

In preparing the catalyst of the present invention, the proportions of the catalyst components are of importance. The metal atom ratio of the component (C) to the component (A) is preferably about 0.001 to 50, more preferably 0.01 to 10, and the proportion of the component (B) is preferably about 1 to 10 moles, more preferably 1.5 to 5 moles, per mole of the component (A).

The amount of the catalyst, in terms of the component (A), is preferably 0.02 to 100 mmol., more preferably not more than 10 mmol., per mole of the monomer.

Norbornene derivatives used as monomers in the present invention are those having at least one polar substituent selected from the group consisting of ester groups, nitrile groups, amide groups, imide groups, carboxylic acid anhydride groups and halogens. Particularly suitable monomers are as follows:

1. Esters

Compounds represented by the general formula,

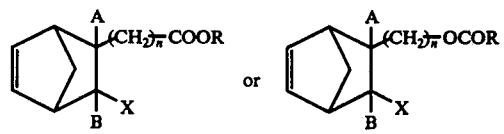

wherein R is a saturated or unsaturated hydrocarbon group having up to 20 carbon atoms; n is an integer of 0 to 10; X is H, $-(CH_2)_m COOR^1$, $-(CH_2)_m OCOR^1$, a saturated or unsaturated hydrocarbon group having up to 10 carbon atoms, $-(CH_2)_m CN$, $-(CH_2)_m CONR^2 R^3$ or a halogen, where $R^1$ is a saturated or unsaturated hydrocarbon group having up to 20 carbon atoms, $R^2$ and $R^3$ are independently H or a saturated or unsaturated hydrocarbon group having up to 10 carbon atoms, and m is an integer of 0 to 10; and A and B are independently H or a saturated or unsaturated hydrocarbon group having up to 10 carbon atoms.

Concrete examples of said compounds include methyl 5-norbornene-2-carboxylate, ethyl 5-norbornene-2-carboxylate, butyl 5-norbornene-2-carboxylate, octyl 5-norbornene-2-carboxylate, lauryl 5-norbornene-2-carboxylate, oleyl 5-norbornene-2-carboxylate, phenyl 5-norbornene-2-carboxylate, methyl 2-methyl-5-norbornene-2-carboxylate, ethyl 3-methyl-5-norbornene-2-carboxylate, ethyl 3,3-dimethyl-5-norbornene-2-carboxylate, cyclohexyl 5-norbornene-2-carboxylate, allyl 5-norbornene-2-carboxylate, methyl 5-norbornene-2,3-dicarboxylate, allyl ethyl 5-norbornene-2,3-dicarboxylate, 5-norbornen-2-yl acetate, 2-methyl-5-norbornen-2-yl acetate, 5-norbornen-2-yl propionate, and the like.

Alternatively, there may be used tricyclic compounds represented by the general formula,

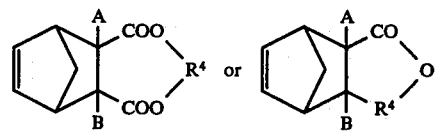

wherein A and B are as defined previously; and $R^4$ is an alkylene group having 1 to 10 carbon atoms, or tetracyclic compounds represented by the general formula.

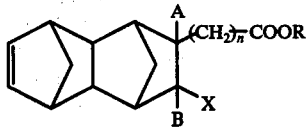

wherein A, B, R, X and n are as defined previously. A concrete example of the compound is methyl 1,4,5,8-dimethano-1,2,3,4,4a5,8,8a-octahydronaphthalene-2-carboxylate

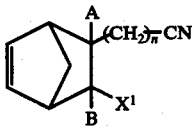

2. Nitriles

Compounds represented by the general formula,

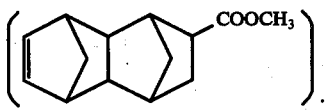

wherein A, B and n are as defined previously; and $X^1$ is H, $-(CH_2)_m CN$, a saturated or unsaturated hydrocarbon group having up to 10 carbon atoms, $-(CH_2)_m\text{-}CONR^2R^3$, where $R^2$, $R^3$ and m are as defined previously.

Concrete examples of said compounds include 5-norbornene-2-nitrile, 2-methyl-5-norbornene-2-nitrile, 3-methyl-5-norbornene-2-nitrile, 3-phenyl-5-norbornene-2-nitrile, 3-ethyl-5-norbornene-2-nitrile, 3-butyl-5-norbornene-2-nitrile, 2,3-dimethyl-5-norbornene-2-nitrile, 3,3-dimethyl-5-norbornene-2-nitrile, 5-norbornene-2,3-dinitrile, and 2-methyl-5-norbornene-2,3-dinitrile.

3. Amides

Compounds represented by the general formula,

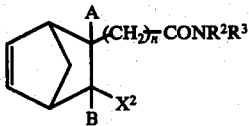

wherein A, B and n are as defined previously; $R^2$ and $R^3$ are independently H or a saturated or unsaturated hydrocarbon group having up to 10 carbon atoms; and $X^2$ is H, $-(CH_2)_m CONR^2R^3$, a saturated or unsaturated hydrocarbon group having up to 10 carbon atoms or a halogen, where m, $R^2$ and $R^3$ are as mentioned previously.

Concrete examples of said compounds include 5-norbornene-2-carboxylic acid amide, N-methyl-5-norbornene-2-carboxylic acid amide, N,N-dimethyl-5-norbornene-2-carboxylic acid amide, N,N-dimethyl-5-norbornene-2-carboxylic acid amide, N-phenyl-5-norbornene-2-carboxylic acid amide, N,N-dicyclohexyl-5-norbornene-2-carboxylic acid amide, N,N-dimethyl-2-methyl-5-norbornene-2-carboxylic acid amide, N,N-diethyl-3-phenyl-5-norbornene-2-carboxylic acid amide, 5-norbornene-2,3-dicarboxylic acid diamide and N,N,N',N'-tetramethyl-5-norbornene-2,3-dicarboxylic acid diamide.

Alternatively, there may be used tricyclic compounds represented by the general formula,

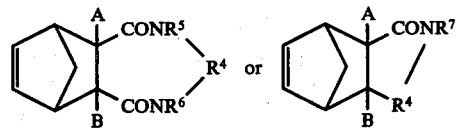

wherein A, B and $R^4$ are as defined previously; and $R^5$, $R^6$ and $R^7$ are independently H or a saturated or unsaturated hydrocarbon group having up to 10 carbon atoms. Examples of the compounds are 4,7-dimethyl-4,7-diazatricyclo-[8.2.1.0$^{2,9}$]tridec-11-ene-3,8-dione, 4-methyl-4-azatricyclo[6.2.1.0$^{2,7}$]undec-9-ene-3-one and the like.

4. Imides

Compounds represented by the general formula,

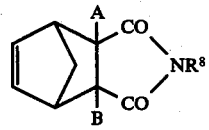

wherein A and B are as defined previously; and $R^8$ is H or a saturated or unsaturated group having up to 10 carbon atoms.

Concrete examples of said compounds include 5-norbornene-2,3-dicarboxylic acid imide, N-methyl-5-norbornene-2,3-dicarboxylic acid imide, N-ethyl-5-norbornene-2,3-dicarboxylic acid imide, N-n-propyl-5-norbornene-2,3-dicarboxylic acid imide, N-octyl-5-norbornene-2,3-dicarboxylic acid imide, N-cyclohexyl-5-norbornene-2,3-dicarboxylic acid imide, N-phenyl-5-norbornene-2,3-dicarboxylic acid imide and N-hexyl-2-methyl-5-norbornene-2,3-dicarboxylic acid imide.

5. Halides

Compounds represented by the general formula,

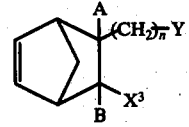

wherein A, B and n are defined previously; Y is a halogen; and $X^3$ is H, $-(Ch_2)_m Y^1$ or a saturated or unsaturaged hydrocarbon group having up to 10 carbon atoms, where m is an integer of 0 to 10, and $Y^1$ is a halogen.

Concrete examples of said compounds include 5-chloro-2-norbornene, 5-methyl-5-chloro-2-norbornene, 6-methyl-5-chloro-2-norbornene and 5-bromo-2-norbornene.

6. Carboxylic acid anhydrides

Compounds represented by the general formula,

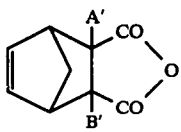

wherein A' and B' are independently H, a saturated or unsaturated hydrocarbon group having up to 10 carbon atoms or $-(CH_2)_n-Y^2$ in which $Y^2$ is a halogen, an ester group, a nitrile group or an amide group, and $n$ is an integer of 0 to 10, and are preferably H or the hydrocarbon group.

Concrete examples of the said anhydrides include norbornene-2,3-dicarboxylic acid anhydride, 2-methyl-5-norbornene-2,3-dicarboxylic acid anhydride, 2-ethyl-5-norbornene-2,3-dicarboxylic acid anhydride, 2-n-butyl-5-norbornene-2,3-dicarboxylic acid anhydride, 2-n-octyl-5-norbornene-2,3-dicarboxylic acid anhydride, 2,3-dimethyl-5-norbornene-2,3-dicarboxylic acid anhydride, 2-methyl-3-ethyl-5-norbornene-2,3-dicarboxylic acid anhydride, 2,3-dichloro-5-norbornene-2,3-dicarboxylic acid anhydride, 2-(methoxycarbonylmethyl)-5-norbornene-2,3-dicarboxylic acid anhydride, and the like. Tetracyclic compounds represented by the general formula,

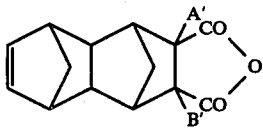

wherein A' and B' are the same as defined above may also be used, and examples thereof are 1,4,5,8-dimethano-1,2,3,4,4a,5,8,8a-octahydronaphthalene-2,3-dicarboxylic acid anhydride and the like. Furthermore, said compounds in which at least one of the hydrogen atoms other than those at the 2- and 3-positions has been substituted by a halogen may be used. Examples thereof are 1,4,5,6,7,7-hexachloronorbornene-2,3-dicarboxylic acid anhydride and the like.

The cycloolefins which may be used as the comonomer in this invention include various compounds. Particularly preferable monomers are cyclobutene, cyclopentene, cyclooctene, 1,5-cyclooctadiene, 1,5,9-cyclododecatriene, norbornene, 5-methylnorbornene, 5-phenylnorbornene, dicyclopentadiene, dihydrodicyclopentadiene and norbornadiene.

The reaction of this invention may be effected in the presence or absence of a solvent. Suitable solvents include hydrocarbons such as hexane, heptane, benzene and toluene; halogenated hydrocarbons such as chloroform, 1,2-dichloroethane and chlorobenzene; ethers such as diethyl ether, dibutyl ether, diphenyl ether and tetrahydrofuran; esters such as ethyl acetate and methyl propionate; and mixtures thereof, though any solvents may be used so far as they do not inactivate the catalyst components at the time of polymerization according to this invention.

A temperature suitable for practice of the process of this invention is in the range from −30° to +200 ° C, preferably from 0° to +150° C.

The molecular weight of the polymer or copolymer obtained according to the polymerization of this invention can be controlled by varying reaction conditions, such as kind and concentration of catalyst, polymerization temperature, kind of solvent, concentration of monomer and the like, though it is preferably controlled by adding to the reaction system a proper amount of a hydrocarbon having in the molecule at least one carbon-carbon double or triple bond, such as α-olefin or α,ω-diolefin; or a polar allyl compound represented by the formula, $CH_2=CR^ICR^{II}R^{III}X^4$ or $(CH_2=CR^IC-R^{II}R^{III})_pY^3$ in which $R^I$, $R^{II}$ and $R^{III}$ are idependently hydrogen or a hydrocarbon group having up to 10 carbon atoms, $X^4$ is a halogen atom, or an $—OR^a$,

or $—NR^cR^d$ group where $R^a$, $R^b$, $R^c$ and $R^d$ are independently hydrogen or a saturated or unsaturated hydrocarbon group having up to 10 carbon atoms, $Y^3$ is a polybasic acid residue and $p$ is the basisity of the polybasic acid. According to this procedure, the molecular weight of the polymer or copolymer can be controlled without substantial change in yield or various properties, such as micro-structure, and the like of the polymer or copolymer.

The concentration of the monomer is variable over a wide range, but is preferably at least 0.1% by weight. The process of the present invention may be carried out in either homogeneous or heterogeneous system and in either batch-wise or continuous manner. The catalyst used in the process of the present invention is relatively unstable to oxygen and moisture in the air, so that the reaction is ordinarily carried out in an inert atmosphere such as nitrogen, helium or argon, and the monomer and the solvent are desirably subjected to degasification and dehydration prior to use.

A polymer or copolymer obtained according to the process of the present invention can be recovered from its solution by adoption of a conventional procedure including the addition of a non-solvent, e.g. a lower alcohol such as ethanol or methanol.

The polymer or copolymer can be stabilized against the action of oxygen by addition of a known antioxidant such as, for example, 2,6-di-tert-butyl-4-methylphenol, 2,2'-dioxy-3,3'-di-tert-butyl-5,5'-dimethyldiphenylmethane or phenyl-β-naphthylamine.

Polymers or copolymers produced by the process of the present invention vary in properties from substantially rubbery to resinous depending on the kind of monomer, the kind of catalyst and the reaction conditions, and are usable as thermoplastic molding materials, plastic-modifying agents, rubbers, and the like.

EXAMPLE 1

Into a 50-ml. glass ampoule which had been flushed with nitrogen were charged 14 mg. (0.04 mmol.) of chromium acetylacetonate and then 20 ml. of toluene (solvent). To the content of the ampoule was added 1 ml. (0.04 mmol.) of a 0.04 mole/l. solution of tungsten hexachloride in toluene, and the resulting mixture was reacted at 25° C. for 10 minutes. After the reaction, 3.2 g. of methyl-5-norbornene-2-carboxylate (I)

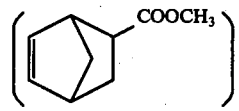

and then 1 ml. (0.12 mmol.) of a 0.12 mole/l. solution of triethylaluminum in toluene were added, and the resulting mixture was reacted at 25° C. for 10 minutes. Subsequently, 1 ml. of a 4 : 1 toluene-methanol mixture containing 2,6-di-tert-butyl-p-cresol (antioxidant) was added to the system to terminate the reaction. The product was coagulated in a large amount of methanol, washed with methanol and then dried under reduced pressure to obtain 1.20 g. of a polymer, yield 38%.

EXAMPLE 2

The procedure of Example 1 was repeated, except that the mixture of chromium acetylacetonate and tungsten hexachloride was reacted at 70° C. for 10 minutes. The results obtained were as shown in Table 1, in which the results obtained in Example 1 are also shown.

EXAMPLE 3

The procedure of Example 1 was repeated, except that the toluene (solvent) was replaced by 20 ml. of chlorobenzene. The results obtained were as shown in Table 1.

EXAMPLE 4

The procedure of Example 1 was repeated, except that the toluene (solvent) was replaced by 20 ml. of ethyl acetate. The results obtained were as shown in Table 1.

EXAMPLES 5 – 8

The procedure of Example 1 was repeated, except that the chromium acetylacetonate was replaced by one of the Cr compounds set forth in Table 1. The results obtained were as shown in Table 1.

REFERENCE EXAMPLE 1

The procedure of Example 1 was repeated, except that the chromium acetylacetonate was not added. The results obtained were as shown in Table 1.

REFERENCE EXAMPLE 2

The procedure of Example 3 was repeated, except that the chromium acetylacetonate was not added. The results obtained were as shown in Table 1.

REFERENCE EXAMPLE 3

The procedure of Example 4 was repeated, except that the chromium acetylacetonate was not added. The results obtained were as shown in Table 1.

Table 1

Polymerization of methyl 5-norbornene-2-carboxylate using $WCl_6 + \alpha + Al(C_2H_5)_3$ catalysts

| Example | α Kind | α/$WCl_6$ molar ratio | Solvent | Amount of polymer obtained (g) | Yield (%) | η sp/C in toluene at 30° C. (dl/g) |
|---|---|---|---|---|---|---|
| 1 | Cr(acac)$_3$ | 1.0 | Toluene | 1.20 | 38 | — |
| 2 | Cr(acac)$_3$* | 1.0 | " | 2.82 | 88 | 1.43 |
| 3 | Cr(acac)$_3$ | 1.0 | Chlorobenzene | 2.24 | 70 | 1.62 |
| 4 | Cr(acac)$_3$ | 1.0 | Ethyl acetate | 1.42 | 44 | 2.99 |
| 5 | Cr(CH$_3$COO)$_3$ | 1.0 | Toluene | 1.51 | 47 | — |
| 6 | CrO$_3$ | 2.5 | " | 1.31 | 41 | — |
| 7 | CrCl$_2$ | 1.0 | " | 1.40 | 44 | 1.67 |
| 8 | Cr(OH)$_3$ | 2.0 | " | 2.44 | 76 | 1.76 |
| Reference Example 1 | None | — | Toluene | 0.74 | 23 | 1.28 |
| 2 | None | — | Chlorobenzene | 0.75 | 23 | 0.78 |
| 3 | None | — | Ethyl acetate | 0.78 | 24 | 1.70 |

Note:
*Reaction of Cr(acac)$_3$ with $WCl_6$ was conducted at 70° C. for 10 minutes.

EXAMPLES 9 14 19

The procedure of Example 1 was repeated, except that the chromium acetylacetonate was replaced by one of the Mn and V compounds set forth in Table 2, and, in some cases, the toluene (solvent) was replaced by 20 ml. of one of the solvents described in Table 2. The results obtained were as shown in Table 2, in which the results obtained in Reference Examples 1 to 3 are also shown.

Table 2

Polymerization of methyl 5-norbornene-2-carboxylate using $WCl_6$—Mn or V compound (α)-Al(C$_2$H$_5$)$_3$ catalysts

| Example | α Kind | α/$WCl_6$ molar ratio | Solvent | Amount of polymer obtained (g) | Yield (%) | ηsp/C in toluene at 30° C. (dl/g) |
|---|---|---|---|---|---|---|
| 9 | Mn(acac)$_3$ | 1.0 | Toluene | 2.48 | 78 | 1.55 |
| 10 | MnO$_2$ | 3.0 | " | 1.19 | 37 | — |
| 11 | MnCl$_2$ | 2.0 | " | 1.13 | 35 | — |
| 12 | Mn(OH)$_2$ | 3.0 | " | 1.15 | 36 | 1.26 |
| 13 | Mn(acac)$_3$ | 1.0 | Chlorobenzene | 2.98 | 93 | 1.51 |
| 14 | Mn(acac)$_3$ | 1.0 | Ethyl acetate | 1.94 | 61 | 2.34 |
| 15 | V(acac)$_3$ | 1.0 | Toluene | 2.44 | 76 | 1.17 |
| 16 | V(acac)$_3$ | 2.0 | Chlorobenzene | 2.74 | 86 | — |

Table 2-continued

Polymerization of methyl 5-norbornene-2-carboxylate using
WCl$_6$—Mn or V compound ($\alpha$)-Al(C$_2$H$_5$)$_3$ catalysts

| Example | α Kind | α/WCl$_6$ molar ratio | Solvent | Amount of polymer obtained (g) | Yield (%) | ηsp/C in toluene at 30° C. (dl/g) |
|---|---|---|---|---|---|---|
| 17 | VCl$_3$ | 4.0 | " | 2.18 | 68 | — |
| 18 | Vanadium octenoate | 2.0 | " | 2.82 | 88 | — |
| 19 | V$_2$O$_5$ | 4.0 | " | 2.92 | 91 | — |
| Reference Example 1 | None | — | Toluene | 0.74 | 23 | 1.28 |
| 2 | None | — | Chlorobenzene | 0.75 | 23 | 0.78 |
| 3 | None | — | Ethyl acetate | 0.78 | 24 | 1.70 |

EXAMPLE 20

Into a 50-ml. glass ampoule which had previously been washed, dried and flushed with nitrogen were charged 6.5 mg. (0.04 mmol.) of purified FeCl$_3$ and then 20 ml. of dehydrated and degasified toluene (solvent). To the content of the ampoule was added 1 ml. (0.04 mmol. WCl$_6$) of a 0.04 mole/l. solution of WCl$_6$ in toluene, and the resulting mixture was reacted at 25° C. for 10 minutes. After the reaction, 3.2 g. of methyl 5-norbornene-2-carboxylate (I) and then 1 ml. (0.12 mmol. Al(C$_2$H$_5$)$_3$) of a 0.12 mole/l. solution of Al(C$_2$H$_5$)$_3$ in toluene were added, and the resulting mixture was reacted at 25° C. for 10 minutes. Subsequently, a 4 : 1 toluene-methanol mixture containing 2,6-di-tert-butyl-p-cresol (antioxidant) was added to the system to terminate the reaction. The product was coagulated in a large amount of methanol, washed with methanol and then dried under reduced pressure to obtain 2.91 g. of a polymer, yield 91%. The polymer had an intrinsic viscosity (ηsp/C) of 1.42 dl/g as measured in toluene at 30° C. (concentration 0.2 g/dl).

EXAMPLE 21

The procedure of Example 20 was repeated, except that FeCl$_3$ was replaced by 14 mg. (0.04 mmol.) of Fe(acac)$_3$. The results obtained were as shown in Table 3, in which the results obtained in Example 20 are also shown.

EXAMPLE 22

The procedure of Example 21 was repeated, except that the mixture of Fe(acac)$_3$ and WCl$_6$ was reacted at 70° C. for 10 minutes. The results obtained were as shown in Table 3.

EXAMPLES 23 – 26

The procedure of Example 20 was repeated, except the FeCl$_3$ was replaced by 0.04 mmol. of one of the metal compounds set forth in Table 3. The results obtained were as shown in Table 3.

EXAMPLE 27

The procedure of Example 21 was repeated, except that the amount of Fe(acac)$_3$ was varied to 7.5 mg. (0.02 mmol.). The results obtained were as shown in Table 3.

EXAMPLE 28

The procedure of Example 21 was repeated, except that the solvent was replaced by 20 ml. of chlorobenzene. The results obtained were as shown in Table 3.

EXAMPLE 29

The procedure of Example 21 was repeated, except that the solvent was replaced by 20 ml. of ethyl acetate. The results obtained were as shown in Table 3.

EXAMPLES 30 – 32

The procedure of Example 20 was repeated, except that FeCl$_3$ was replaced by one of the metal compounds set forth in Table 3. The results obtained were as shown in Table 3.

EXAMPLES 33 – 35

The procedure of Example 28 was repeated, except that Fe(acac)$_3$ was replaced by 0.04 mmol. of one of the metal compounds set forth in Table 3. The results obtained were as shown in Table 3.

REFERENCE EXAMPLE 4

The procedure of Example 20 was repeated, except that FeCl$_3$ was not added. The results obtained were as shown in Table 3.

REFERENCE EXAMPLE 5

The procedure of Example 28 was repeated, except that Fe(acac)$_3$ was not added. The results obtained were as shown in Table 3.

REFERENCE EXAMPLE 6

The procedure of Example 29 was repeated, except that Fe(acac)$_3$ was not added. The results obtained were as shown in Table 3.

Table 3

Polymerization of the compound (I) using WCl$_6$-α-Al(C$_2$H$_5$)$_3$ catalysts

| Example | α Kind | α/WCl$_6$ molar ratio | Solvent | Amount of polymer obtained (g) | Yield (%) | ηsp/C in toluene at 30° C. (dl/g) |
|---|---|---|---|---|---|---|
| 20 | FeCl$_3$ | 1.0 | Toluene | 2.91 | 91 | 1.42 |
| 21 | Fe(acac)$_3$ | 1.0 | " | 1.68 | 54 | — |
| 22* | " | 1.0 | " | 2.11 | 66 | — |
| 23 | CoCl$_2$ | 1.0 | " | 1.49 | 47 | — |

Table 3-continued
Polymerization of the compound (I) using $WCl_6$-α-$Al(C_2H_5)_3$ catalysts

| Example | α Kind | α/$WCl_6$ molar ratio | Solvent | Amount of polymer obtained (g) | Yield (%) | ηsp/C in toluene at 30° C. (dl/g) |
|---|---|---|---|---|---|---|
| 24 | $Co(acac)_3$ | 1.0 | " | 1.32 | 41 | — |
| 25 | $NiCl_2$ | 1.0 | " | 1.28 | 40 | — |
| 26 | $Ni_2O_3$ | 1.0 | " | 1.38 | 43 | 1.29 |
| 27 | $Fe(acac)_3$ | 0.5 | " | 3.02 | 95 | 1.47 |
| 28 | $Fe(acac)_3$ | 1.0 | Chlorobenzene | 2.53 | 79 | 1.58 |
| 29 | " | 1.0 | Ethyl acetate | 1.50 | 47 | 1.47 |
| 30 | $FeCl_2$ | 1.0 | Toluene | 2.09 | 65 | 2.78 |
| 31 | $Fe(OH)_3$ | 2.0 | " | 2.92 | 91 | 2.20 |
| 32 | $CoBr_2$-$[P(C_2H_5)_3]_2$ | 1.0 | " | 3.02 | 94 | 2.19 |
| 33 | $Pd(acac)_2$ | 1.0 | Chlorobenzene | 1.98 | 62 | — |
| 34 | $PdCl_2$ | 1.0 | " | 1.60 | 50 | — |
| 35 | $RuBr_2$ | 1.0 | " | 1.73 | 54 | — |
| Reference Example 4 | None | — | Toluene | 0.74 | 23 | 1.28 |
| 5 | None | — | Chlorobenzene | 0.75 | 23 | 0.78 |
| 6 | None | — | Ethyl acetate | 0.78 | 24 | 1.70 |

*Reaction of $WCl_6$ with $Fe(acac)_3$ was conducted at 70° C. for 10 minutes.

EXAMPLE 36

Into a 50-ml. glass ampoule which had previously been dried and flushed with nitrogen were charged 0.2 ml. of a 0.1 mole/l. solution of $Zr(acac)_4$ in chlorobenzene, 20 ml. of chlorobenzene (solvent) and 3.2 g. of methyl 5-norbornene-2-carboxylate (I), and the resulting mixture was sufficiently stirred. Subsequently, 0.5 ml. of a 0.05 mole/l. solution of $WCl_6$ in chlorobenzene was added, and the mixture was aged for 5 minutes with stirring. Thereafter, 0.5 ml. of a 0.12 mole/l. solution of $Al(C_2H_5)_3$ in toluene was added to initiate the reaction of the mixture.

After reaction the mixture at 25° C. for 4 minutes, 2 ml. of a 4 : 1 (vol./vol.) toluene-methanol mixture containing 2,6-di-tert-butyl-p-cresol (antioxidant) was added to the system to terminate the reaction. The reaction mixture was charged into a large amount of methanol to deposit precipitates, which were then washed with methanol and dried under reduced pressure at 50° C. for 20 hours to obtain 3.01 g. of a polymer, yield 94% (refer to Table 4).

EXAMPLE 37

The procedure of Example 36 was repeated, except that the amount of the $Zr(acac)_4$ solution was varied to 0.05 ml. The results obtained were as shown in Table 4.

EXAMPLE 38

Into a 50-ml. glass ampoule which has previously been dried and flushed with nitrogen was charged 20 mg. (0.0013 mmol.) of $TiO_2$. The $TiO_2$ was dried in vacuum ($10^{-3}$ mmHg) at room temperature for 2 hours, and then the system was flushed with nitrogen. To the $TiO_2$ were added 20 ml. of toluene (solvent) and 3.2 g. of the compound (I), and the resulting mixture was sufficiently stirred. Subsequently, 1 ml. of a 0.02 mole/l. solution of $WCl_6$ is toluene was added, and the mixture was aged for 5 minutes with stirring.

To this system was added 0.5 ml. of a 0.12 mole/l. solution of $Al(C_2H_5)_3$ in toluene, and the mixture was reacted at 25° C. for 7 minutes. After the reaction, the same treatment as in Example 36 was effected to recover the resulting polymer. The results obtained were as shown in Table 4.

EXAMPLES 39 – 41

The procedure of Example 38 was repeated, except that $TiO_2$ was replaced by one of the metal compounds set forth in Table 4. The results obtained were as shown in Table 4.

EXAMPLE 42

The procedure of Example 38 was repeated, except that $TiO_2$ was replaced by 20 mg (0.006 mmol.) of (n-$C_4H_9O)_4Ti$ and the 2 hours' vacuum drying was omitted. The result obtained were as shown in Table 4.

EXAMPLE 43

The procedure of Example 42 was repeated, except that (n-$C_4H_9O)_4Ti$ was replaced by 20 mg. (0.0026 mmol.) of $(C_5H_5)_2TiCl_2$ which had previously been purified and dried. The results obtained were as shown in Table 4.

EXAMPLE 44

The procedure of Example 42 was repeated, except that (n-$C_4H_9O)_4Ti$ was replaced by 20 mg. (0.0026 mmol.) of (n-$C_4H_9O)_4Zr$. The results obtained were as shown in Table 4.

REFERENCE EXAMPLE 7

The procedure of Example 36 was repeated, except that the $Zr(acac)_4$ solution was not added. The amount of the resulting polymer was 0.65 g., yield 20%.

When this result is compared with the results obtained in Examples 36 and 37, it is clear how excellent are the catalysts of the present invention (refer to Table 4).

REFERENCE EXAMPLE 8

The procedure of Example 38 was repeated, except that $TiO_2$ was not added. The amount of the resulting polymer was 0.92 g., yield 28%.

When this result is compared with the results obtained in Examples 38 to 44, it is understood how excellent are the catalysts of the present invention.

Table 4

Polymerization of the compound (I) using [WCl₆ + component (C)] + Al(C₂H₅)₃ catalysts

| | Component (C) | | | Polymerization conditions | | Polymer yield | | |
|---|---|---|---|---|---|---|---|---|
| Example | Kind | Amount (mmol.) | (C)/WCl₆ molar ratio | (° C.) | (min) | (g) | (%) | Solvent |
| 36 | Zr(acac)₄ | 0.02 | 0.8 | 25 | 4 | 3.01 | 94 | Chlorobenzene |
| 37 | " | 0.005 | 0.2 | " | 4 | 2.82 | 87 | " |
| 38 | TiO₂ | 0.0013 | 0.065 | " | 7 | 2.73 | 85 | Toluene |
| 39 | TiO(acac)₂ | 0.0038 | 0.19 | " | 7 | 3.13 | 98 | " |
| 40 | TiSi | 0.0023 | 0.115 | " | 7 | 3.00 | 93 | " |
| 41 | ZrCl₄ | 0.004 | 0.2 | " | 7 | 3.03 | 94 | " |
| 42 | (n-C₄H₉O)₄Ti | 0.006 | 0.3 | " | 7 | 3.13 | 98 | " |
| 43 | (C₅H₅)₂TiCl₂ | 0.004 | 0.2 | " | 7 | 3.20 | 100 | " |
| 44 | (n-C₄H₉O)₄Zr | 0.0026 | 0.13 | " | 7 | 2.90 | 90 | " |
| Reference Example 7 | — | — | — | " | 4 | 0.65 | 20 | Chlorobenzene |
| 8 | — | — | — | " | 7 | 0.92 | 28 | Toluene |

EXAMPLE 45

In a 100-ml. glass ampoule which had previously been dried and flashed with nitrogen were placed 3 ml. of a toluene solution (0.1 mole/l.) of Ti(O-n-C₄H₉)₄ and 2 ml. of a toluene solution (0.05 mole/l.) of WCl₆, and the resulting mixture was subjected to reaction for 10 minutes at room temperature. To the reaction mixture were subsequently added 12 ml. of 5-norbornene-2-nitrile (II)

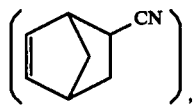

1 ml. of a toluene solution (0.2 mole/l.) of 1-hexene, 50 ml. of 1,2-dichloroethane (solvent) and 0.6 ml. of a toluene solution (0.5 mole/l.) of Al(iso-C₄H₉)₃ in this order, after which the ampoule was sealed and then shaken in a thermostat at 50° C for 4 hours to effect the reaction.

After completion of the reaction, the reaction mixture was poured into methanol containing 2,6-di-tert-butyl-cresol (antioxidant) to precipitate a polymer, which was then filtered, washed with methanol and then dried at 60° C for 20 hours under reduced pressure. The yield of the polymer was 8.2 g.(69%) (see Table 5).

EXAMPLE 46

The same procedure as in Example 45 was repeated, except that 100 mg. of TiO₂ was substituted for the toluene solution of Ti(O-n-C₄H₉)₄. The results obtained are shown in Table 5.

EXAMPLE 47

The same procedure as in Example 45 was repeated, except that 75 mg. of (C₅H₅)₂TiCl₂ was substituted for the toluene solution of Ti(O-n-C₄H₉)₄. The results obtained are shown in Table 5.

EXAMPLE 48

The same procedure as in Example 45 was repeated, except that 99 mg. of HfO₂ was substituted for the toluene solution of Ti(O-n-C₄H₉)₄ and the polymerization time was 20 hours. The results obtained are shown in Table 5.

EXAMPLE 49

The same procedure as in Example 45 was repeated, except that 75 mg. of V₂O₅ was substituted for the toluene solution of Ti(O-n-C₄H₉)₄. The results obtained are shown in Table 5.

EXAMPLE 50

The same procedure as in Example 45 was repeated, except that 18.2 mg. of Cr(OH)₃ was substituted for the toluene solution of Ti(O-n-C₄H₉)₄. The results obtained are shown in Table 5.

EXAMPLE 51

The same procedure as in Example 48 was repeated, except that 60 mg. of Cr(acac)₃ was substituted for the HfO₂ and reacted with the WCl₆ at 70° C for 10 minutes. The results obtained are shown in Table 5.

EXAMPLE 52

The same procudre as in Example 45 was repeated, except that 35.3 mg. of Mn(acac)₃ was substituted for the toluene solution of Ti(O-n-C₄H₉)₄. The results obtained are shown in Table 5.

EXAMPLE 53

The same procedure as in Example 45 was repeated, except that 16.2 mg. of FeCl₃ was substituted for the toluene solution of Ti(O-n-C₄H₉)₄. The results obtained are shown in Table 5.

REFERENCE EXAMPLE 9

The same procedure as in Example 45 was repeated, except that the toluene solution of Ti(O-n-C₄H₉)₄ was not used. The yield of polymer was 0.84 g. (7.0%).

REFERENCE EXAMPLE 10

The same procedure as in Example 48 was repeated, except that the HfO₂ was not used. The yield of polymer was 1.19 g. (9.9%).

Table 5

Polymerization of compound (II) using [WCl$_6$ + component (C)] + Al(iso-C$_4$H$_9$)$_3$ catalyst

| Example | Component (C) Kind | Amount (mmol.) | (C)/WCl$_6$ molar ratio | Polymerization conditions (°C) | (hrs) | Polymer yield (g) | (%) |
|---|---|---|---|---|---|---|---|
| 45 | Ti(O-n-C$_4$H$_9$)$_4$ | 0.30 | 3.0 | 50 | 4 | 8.21 | 69 |
| 46 | TiO$_2$ | 1.25 | 12.5 | " | 4 | 1.31 | 10.9 |
| 47 | (C$_5$H$_5$)$_2$TiCl$_2$ | 0.41 | 4.1 | " | 4 | 1.35 | 11.3 |
| 48 | HfO$_2$ | 0.47 | 4.7 | " | 20 | 1.53 | 12.8 |
| 49 | V$_2$O$_5$ | 0.41 | 4.1 | " | 4 | 1.23 | 10.3 |
| 50 | Cr(OH)$_3$ | 0.58 | 5.8 | " | 4 | 2.41 | 20.1 |
| 51 | Cr(acac)$_3$ | 0.40 | 4.0 | " | 20 | 3.19 | 26.6 |
| 52 | Mn(acac)$_3$ | 0.23 | 2.3 | " | 4 | 1.19 | 9.9 |
| 53 | FeCl$_3$ | 0.10 | 1.0 | " | 4 | 1.61 | 13.5 |
| Reference Example 9 | — | — | — | " | 4 | 0.84 | 7.0 |
| Reference Example 10 | — | — | — | " | 20 | 1.19 | 9.9 |

EXAMPLE 54

Into a 50-ml. ampoule which had previously been dried and flushed with nitrogen was weighed 48 mg. of Cr(acac)$_3$ and then 10 ml. of dehydrated and degasified 1,2-dichloroethane was added thereto. To the ampoule was added 0.5 ml. of a 0.05 mole/l. toluene solution of WCl$_6$ (0.025 mmol. of WCl$_6$), and the resulting mixture was subjected to reaction at 70° C for 10 minutes, after which 2 ml. of N,N-dimethyl-5-norbornene-2-carboxylic acid amide (III)

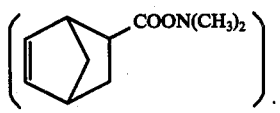

To the ampoule was subsequently added 0.075 ml. of a 1.0 mole/l. toluene solution of Al(C$_2$H$_5$)$_3$, and the ampoule was then shaken at 50° C for 20 hours to effect the reaction.

After completion of the reaction, the reaction mixture was poured into petroleum ether containing 2,6-di-tert-butyl-p-cresol (antioxidant) to precipitate at polymer, which was then filtered, washed with petroleum either and thereafter dried under reduced pressure at 60° C for 20 hours. The yield of polymer was 0.63 g.

EXAMPLE 55

The same procedure as in Example 54 was repeated, except that 49 mg. of HfO$_2$ was substituted for the Cr(acac)$_3$ and reacted with the WCl$_6$ at 25° C for 10 minutes. The yield was 0.79 g.

REFERENCE EXAMPLE 11

The same procedure as in Example 54 was repeated, except that the Cr(acac)$_3$ was not used. The yield of polymer was 0.45 g.

EXAMPLE 56

In a 100-ml. glass ampoule prepared in the same manner as in Example 45 were placed 0.25 ml. of a toluene solution (0.1 mole/l.) of Ti(O-n-C$_4$H$_9$)$_4$ and 0.5 ml. of a toluene solution (0.05 mole/l.) of WCl$_6$, and the resulting mixture was subjected to reaction at room temperature for 10 minutes. To the reaction mixture were then added 4 ml. of the compound (I), 3 ml. of the compound (II), 0.25 ml. of a toluene solution (2 moles/l.) of 1-hexene, 30 ml. of 1,2-dichloroethane (solvent) and 0.075 ml. of a toluene solution (1 mole/l.) of Al(iso-C$_4$H$_9$)$_3$ in this order, after which the ampoule was sealed and then shaken in a thermostat at 50° C for 2 hours to effect the reaction. After completion of the reaction, the resulting polymer was recovered in the same manner as in Example 45. The yield of the polymer was 6.8 (91%).

Reference Example 12

The same procedure as in Example 56 was repeated, except that the toluene solution of Ti(O-n-C$_4$H$_9$)$_4$ was not used. The polymer yield was 4.7 g. (62%).

What is claimed is:

1. A process for producing a polymer or copolymer of a norbornene derivative, which comprises contacting at a temperature in the range from −30° to +200° C in an inert atmosphere at least one norbornene derivative having at least one nitrile group, or a monomer mixture of at least one of said norbornene derivative and at least one cycloolefin other than cyclohexene, with a catalyst composition consisting essentially of a reaction mixture of (A) at least one member selected from the group consisting of halides, oxyhalides, alkoxyhalides and phenoxyhalides of W and Mo, (B) at least one member selected from the group consisting of organometallic compounds of elements of Groups IA, IIA, IIB and IIIA of the Deming Periodic Table, and (C) at least one member selected from the group consisting of oxides, hydroxides, nitrates, sulfates, phosphates, formates, acetates, acetylacetone complexes, alkoxides, alkenoxides, phenoxides and ammine complexes of V, Cr and Mn, oxides, sulfates, phosphates, alkoxides, alkenoxides, phenoxides, acetylacetone complexes, cyclopentadienyl complexes, hydride complexes and silicides of elements of Group IVB of the Deming Periodic Table and oxides, peroxides, hydroxides, sulfates, phosphates, formates, acetates, acetylacetone complexes, alkoxides, alkenoxides, phenoxides and ammine complexes of elements of Group VIII of the Deming Periodic Table; the metal atom ratio of the component (C) to the component (A) being 0.001 to 50, and the proportion of the component (B) being 1 to 10 moles per mole of the component (A).

2. A process according to claim 1, wherein the norbornene derivative is at least one compound selected from the group consisting of nitriles having the formula:

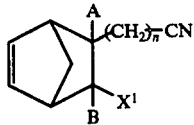

wherein $X^1$ is $-(CH_2)_m CN$, a saturated or unsaturated hydrocarbon group having up to 10 carbon atoms, $-(CH_2)_m CONR^2R^3$ or a halogen, where $R^2$ and $R^3$ are independently H or a saturated or unsaturated hydrocarbon group having up to 10 carbon atoms, and $m$ is an integer of 0 to 10; A and B are independently H or a saturated or unsaturated hydrocarbon group having up to 10 carbon atoms; and $n$ is an integer of 0 to 10.

3. A process according to claim 1, wherein the norbornene derivative is at least one nitrile selected from the group consisting of norbornene-2-nitrile, 2-methyl-5-norbornene-2-nitrile, 3-methyl-5-norbornene-2-nitrile, 3-phenyl-5-norbornene-2-nitrile, 3-ethyl-5-norbornene-2-nitrile, 3-butyl-5-norbornene-2-nitrile, 2,3-dimethyl-5-norbornene-2-nitrile, 3,3-dimethyl-5-norbornene-2-nitrile, 5-norbornene-2,3-dinitrile and 2-methyl-5-norbornene-2,3-dinitrile.

4. A process according to claim 1, wherein the cycloolefin is selected from the group consisting of cyclobutene, cyclooctene, 1,5-cyclooctadiene, 1,5,9-cyclododecatriene, norbornene, 5-methylnorbornene, 5-phenylnorbornene, dicyclopentadiene, dihydrodicyclopentadiene and norbornadiene.

5. A process according to claim 1, wherein the component (A) is selected from the group consisting of $WCl_6$, $WCl_5$, $WCl_4$, $WBr_6$, $WF_6$, $WI_6$, $MoCl_5$, $MoCl_4$, $MoCl_3$, $WOCl_4$, $MoOCl_3$, $WCl_2(OPh)_4$, $Mo(OC_2H_5)_2Cl_3$, wherein Ph means phenyl.

6. A process according to claim 1, wherein the component (B) is selected from the group consisting of n-$C_4H_9Li$, n-$C_5H_{11}Na$, $C_5H_5Na$, $CH_3MgI$, $C_2H_5MgBr$, $CH_3MgBr$, n-$C_3H_7MgCl$, t-$C_4H_9MgCl$, $CH_2=CH-CH_2MgCl$, $(C_2H_5)_2Zn$, $(C_2H_5)_2Cd$, $CaZn(C_2H_5)_4$, $(CH_3)_3B$, $(C_2H_5)_3B$, (n-$C_4H_9)_3B$, $(CH_3)_3Al$, $(C_2H_5)_3Al$, $(C_2H_5)_3Al.O(C_2H_5)_2$, $(C_2H_5)_2AlCl$, $C_2H_5AlCl_2$, $(C_2H_5)_2AlH$, (iso-$C_4H_9)_2AlH$, $(C_2H_5)_2AlOC_2H_5$, (iso-$C_4H_9)_3Al$, $(C_2H_5)_3Al_2Cl_3$, (n-$C_6H_{13})_3Al$ and (n-$C_8H_{17})_3Al$.

7. A process according to claim 1, wherein the component (B) is selected from the group consisting of organometallic compounds of Al, Mg and Zn.

8. A process according to claim 1, wherein the component (B) is selected from the group consisting of organometallic compounds of Al.

9. A process according to claim 1, wherein the component (C) is selected from the group consisting of $V_2O_5$, $CrO_3$, $MnO_2$, $Cr(OH)_3$, $Mn(OH)_2$, $VSO_4$, $Cr(NO_3)_3$, $Cr_2(SO_4)_3$, $MnSO_4$, vanadium octenoate, vanadium naphthenate, chromium naphthenate, manganese naphthenate, $Mn(OCOCH_3)_2$, $Cr(OCOCH_3)_3$, $V(acac)_2$, $Cr(acac)_2$, $VO(acac)_2$, $Mn(acac)_3$, in which acac means acetylacetone residue, and $V(OC_2H_5)_3$.

10. A process according to claim 1, wherein the component (C) is selected from the group consisting of $TiO_2$, $ZrO_2$, $HfO_2$, $Ti(OC_2H_5)_4$, $Ti(Oiso-C_3H_7)_4$, $Ti(Ot-C_4H_9)_4$, $Zr(On-C_4H_9)_4$, $Hf(On-C_4H_9)_4$, $Ti(OC_3H_5)_4$, $Ti(OC_6H_5)_4$, $Ti(SO_4)_2$, $Ti(PO_4)_4$, $Zr(PO_4)_4$, $TiO(acac)_2$, $Zr(acac)_4$, $Hf(acac)_4$ in which acac means acetylacetone residue, and TiSi.

11. A process according to claim 1, wherein the component (C) is selected from the group consisting of $Fe_2O_3$, $Ni_2O_3$, $Co_2O_3$, $RuO_2$, $PtO_2$, $OsO_4$, $NiO_2$, $NiO$, $Fe(OH)_3$, $FeSO_4$, $CoSO_4.6H_2O$, $NiSO_4$, nickel phosphate, $Ni(OCOCH_3)_2$, $Co(OCOC_2H_5)_2$, nickel naphthenate, cobalt octenoate, iron naphthenate, $Fe(acac)_3$, $Fe(acac)_2$, $Co(acac)_3$, $Ni(acac)_2$, $Pd(acac)_2$ in which acac means acetylacetone residue, and $Fe$ (On-$C_4H_9)_3$.

12. A process according to claim 1, wherein the metal atom ratio of the component (C) to the component (A) is 0.001 to 10.

13. A process according to claim 1, wherein the proportion of the component (B) is 1.5 to 5 moles per mole of the component (A).

14. A process according to claim 1, wherein the concentration of the norbornene derivative is at least 0.1% by weight.

15. A process according to claim 1, wherein the norbornene derivative or the monomer mixture is contacted with the catalyst in an amount corresponding to 0.02 to 100 mmol. of the component (A) per mole of the monomer or monomer mixture.

16. A process according to claim 1, wherein the norbornene derivative or the monomer mixture is contacted with the catalyst in the presence of a solvent.

17. A process according to claim 16, wherein the solvent is at least one member selected from the group consisting of hydrocarbons, halogenated hydrocarbons, ethers and esters.

18. A process according to claim 16, wherein the solvent is selected from the group consisting of hexane, heptane, benzene, toluene, chloroform, 1,2-dichloroethane, chlorobenzene, diethyl ether, dibutyl ether, diphenyl ether, tetrahydrofuran, ethyl acetate and methyl propionate.

19. A process according to claim 1, wherein the inert atmosphere is nitrogen, helium or argon.

20. A process according to claim 1, wherein the norbornene derivative or the monomer mixture is contacted with the catalyst in the presence of a molecular weight regulator.

21. A process according to claim 20, wherein the molecular weight regulator is a hydrocarbon having in the molecule at least one carbon-carbon double or triple bond.

22. A process according to claim 20, wherein the molecular weight regulator is a polar allyl compound represented by the formula, $CH_2=CR^I CR^{II}R^{III}X^4$ or $(CH_2=CR^I CR^{II}R^{III})_p Y^3$ in which $R^I$, $R^{II}$ and $R^{III}$ are independently hydrogen or a hydrocarbon having up to 10 carbon atoms, $X^4$ is a halogen atom or an $-OR^a$,

or $-NR^cR^d$ group in which $R^a$, $R^b$, $R^c$ and $R^d$ are independently hydrogen or a saturated or unsaturated hydrocarbon group having up to 20 carbon atoms, $Y^3$ is a polybasic acid residue, and $p$ is the basicity of the polybasic acid.

* * * * *